March 14, 1944.  F. H. SHAW  2,344,176
METHOD OF AND MACHINE FOR MOLDING PLASTICS
Filed Oct. 11, 1938  3 Sheets-Sheet 1

March 14, 1944. F. H. SHAW 2,344,176
METHOD OF AND MACHINE FOR MOLDING PLASTICS
Filed Oct. 11, 1938 3 Sheets-Sheet 2
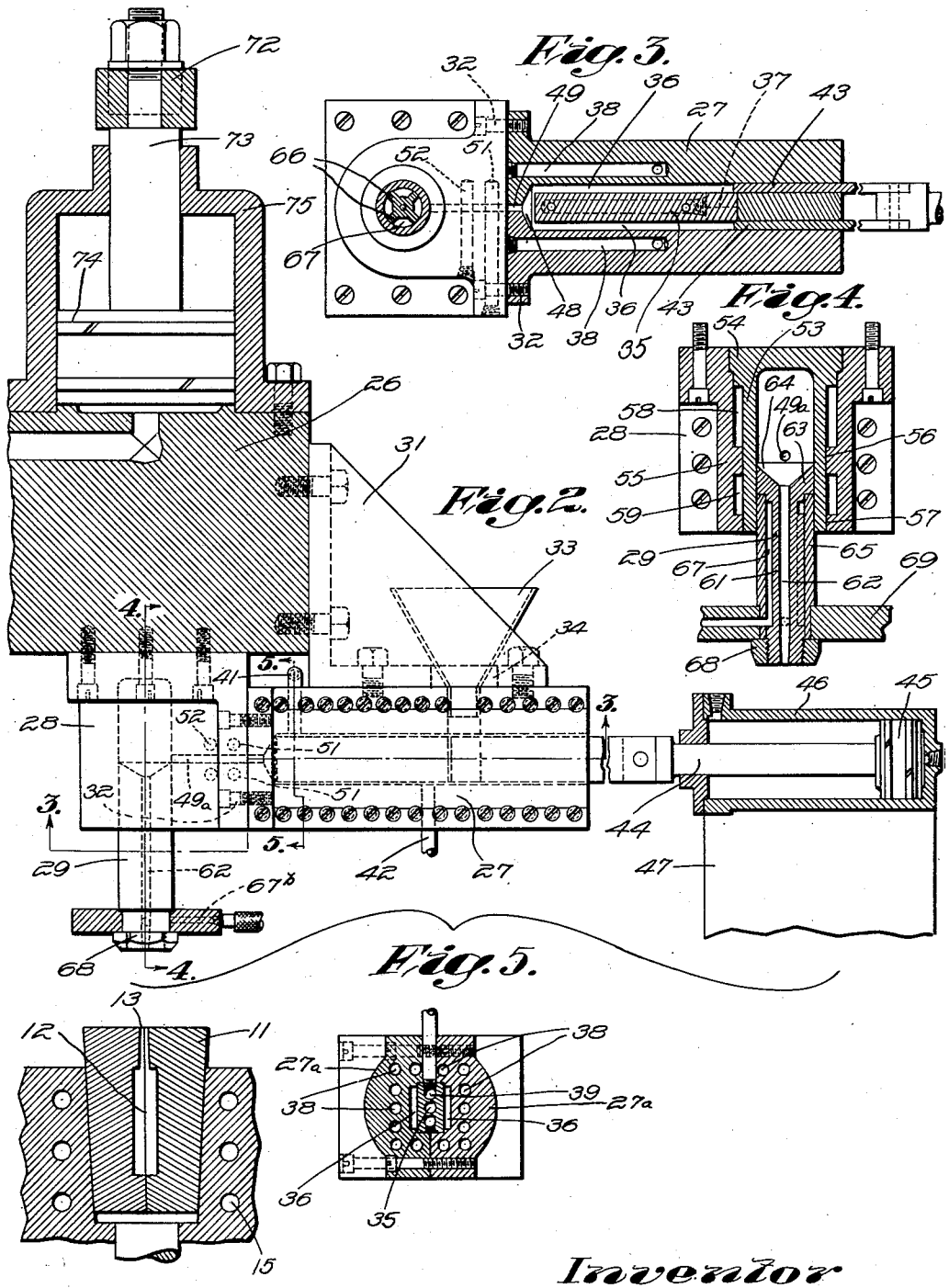
Inventor
Frank H. Shaw
by Brown + Parham
Attorneys
Witness
W. B. Thayer.

March 14, 1944.    F. H. SHAW    2,344,176
METHOD OF AND MACHINE FOR MOLDING PLASTICS
Filed Oct. 11, 1938    3 Sheets-Sheet 3
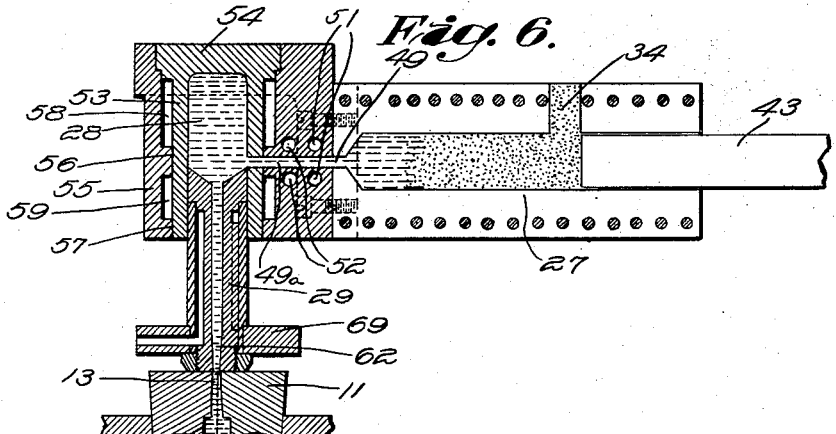
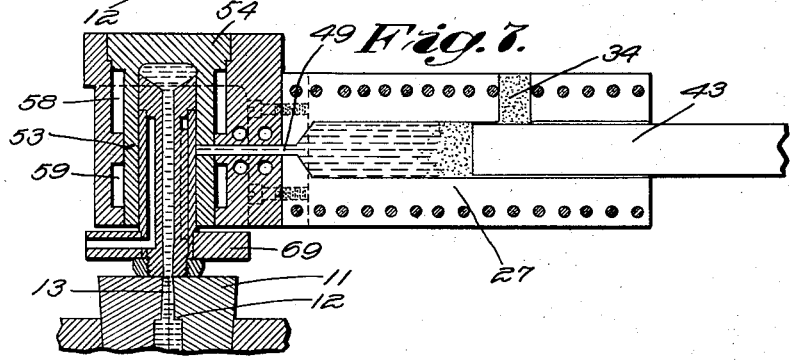
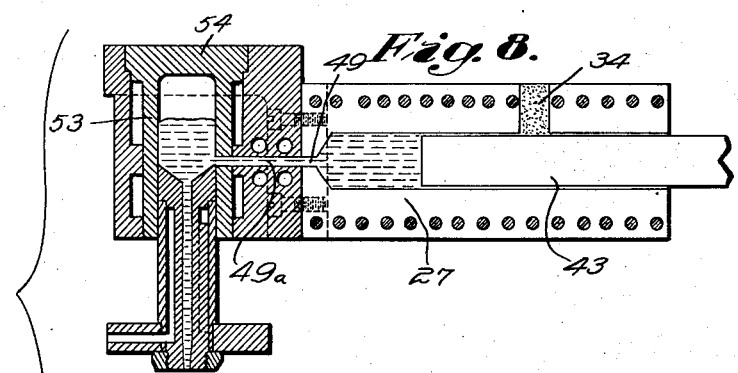
Inventor
Frank H. Shaw
by Brown & Parham
Attorneys
Witness
W. B. Shafer Patented Mar. 14, 1944

2,344,176

UNITED STATES PATENT OFFICE 2,344,176

METHOD OF AND MACHINE FOR MOLDING PLASTICS

Frank H. Shaw, South Orange, N. J., assignor to Shaw Insulator Company, Irvington, N. J., a corporation of New Jersey Application October 11, 1938, Serial No. 234,346

6 Claims. (Cl. 18—30)

This invention relates to the molding of plastics, particularly the molding of plastics by the heating of a molding compound and the delivery thereof under hydrostatic pressure to a closed die or mold.

The general object of the invention is to provide a novel method of and machine for molding plastics in the above manner by the employment of which molding compound may be more efficiently heated and supplied to a die more rapidly and in larger volume than in prior methods and machines, so that the rate of production of molded articles may be increased.

A more specific object is to provide a novel method and a novel machine for molding plastics of the thermosetting type, such as phenol-formaldehyde and urea-formaldehyde resins. The molding of thermosetting materials by delivery thereof under hydrostatic pressure to closed dies in which the materials are reacted to hard infusible condition has been employed by me commercially in the production of great numbers of articles of wide variety. This art is known in the molding industry as "transfer molding" and this invention seeks to provide an improvement in transfer molding for more rapid and efficient production of articles from thermosetting plastics. The method and machine of the invention permit continual periodic delivery of plastic to a die and such control of the temperature of the plastic that no cull or excess set material need be formed, as in prior commercial transfer molding. The molding compound may be heated so uniformly that curing time in the die is substantially reduced, while at the same time case hardening of articles is avoided.

Other objects and advantages will be pointed out in the detailed description which follows and which refers to the accompanying drawings which illustrates one embodiment of the invention. In said drawings:

Fig. 2 is an enlarged view in cross sectional elevation of portions of the machine shown in Fig. 1;

Fig. 3 is a view in horizontal sectional bottom plan taken on line 3—3 of Fig. 2 looking in the direction of the arrows;

Fig. 4 is a view in central vertical section taken on the line 4—4 of Fig. 2 looking in the direction of the arrows;

Fig. 5 is a cross sectional view taken on the line 5—5 of Fig. 2, and

Figs. 6, 7 and 8 are views in vertical section partially diagrammatic of part of the construction of Fig. 2 illustrating, in conjunction with Fig. 1, certain steps in my novel method.

Figure 1:
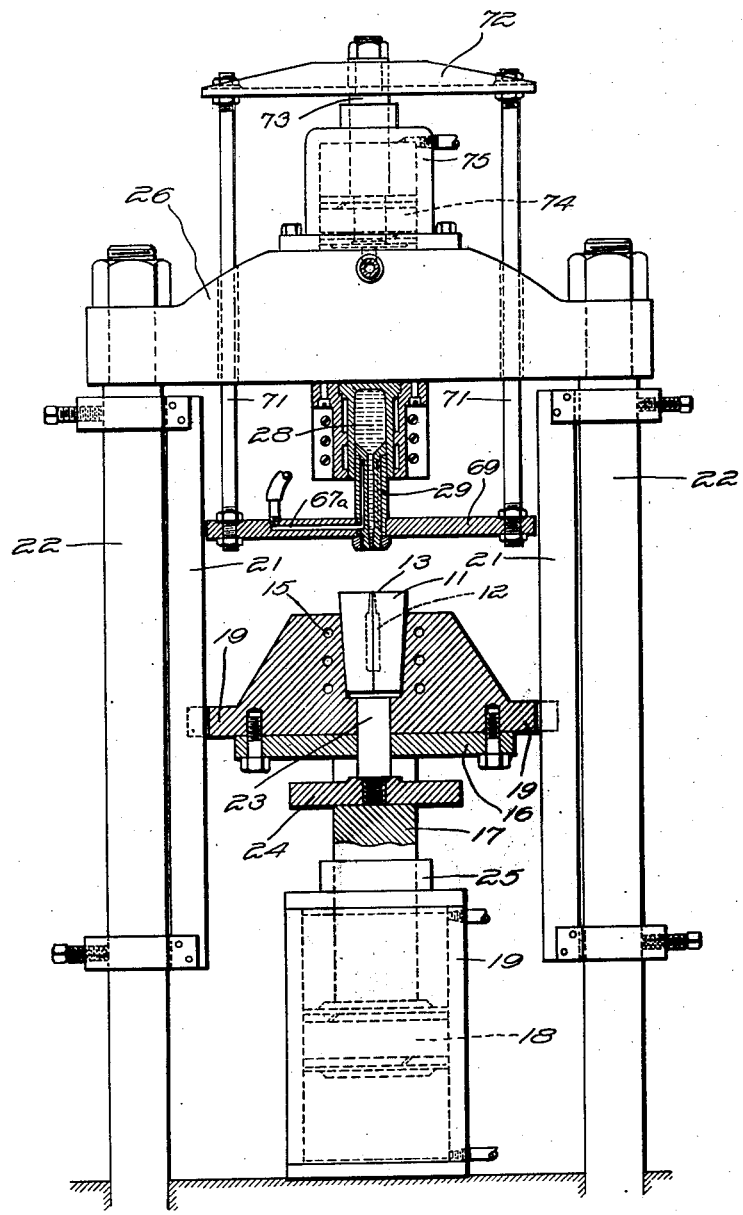
Figure 1 is a view in vertical sectional elevation of a machine embodying the invention.

The molding machine illustrated in the drawings, particularly Fig. 1, includes a die 11 containing a cavity 12 which receives plastic through a sprue 13. The die, which is of the hand or portable type, consists of halves which are exteriorly tapered and may be wedged into a tapered chase 14. Chase 14 contains passages 15 for temperature controlling medium and is secured to plate 16 on rod 17 of piston 18 in cylinder 19, whereby the die 11 may be raised and lowered hydraulically. Chase 14 has wings 19 which cooperate with guides 21 on rods 22 of the machine to prevent the chase 14 from turning. Die 11 may be loosened from the chase 14 by a knockout pin 23 on a bar 24 passing through rod 17. Upon descent of the chase 14, bar 24 strikes collar on piston 19 which loosens and raises the die 11 with respect to chase 14. The die may then be removed laterally from the chase.

Plastic is delivered to die 11 by the plastic heating and die loading means carried by the head 26 of the machine and which comprises a preheater 27, Figs. 2 to 8, a loading chamber 28, Figs. 1 to 8, and a combined plunger and nozzle 29 which serves the die 11 with plastic.

The preheater 27 is bolted upon a bracket 31 (Fig. 2) mounted on the rear of the head 26 of the machine and also is secured by bolts 32 (Fig. 3) to loading chamber 28 which is bolted to the underside of head 26 as shown in Figs. 1 and 2.

The preheater 27 receives molding compound or powder through a funnel 33 in inlet 34 which overlies the outer end of a core 35 clamped centrally in the preheater (see Fig. 5) between the outer halves thereof 27a, so as to provide separated passages 36 of rectangular shape in cross section extending lengthwise of the preheater. As shown in Fig. 5, core 35 fits in recesses in the outer halves of the preheater and is rigidly supported throughout its length. Core 35 is tapered upwardly to a thin edge at inlet 34, as indicated by the dotted line at 37 in Fig. 3. This provides sloping surfaces (not shown) which direct the molding compound into the passages 36. The rectangular shape of passages 36 provides a large area per unit of volume of plastic which is desirable for efficient heating of plastics.

The outer halves 27a of the preheater are cored with longitudinal passages 38 for the circulation of heating medium through the walls of the preheater. Core 35 has similar passages 39 with inlet 41 and outlet 42. The inlet and outlet for passages 38 are not shown. These heating passages terminate a substantial distance inwardly of the feeding inlet 34 to prevent undesired heating of the molding compound at the entering end portions of passages 36. See Fig. 3.

Plungers 43 reciprocate in passages 36 to compress the molding compound as it is heated in thin rectangular sections between the core 35 and outer walls of the preheater. Plungers 43 are likewise rectangular in cross section and are connected to a rod 44 of piston 45 in cylinder 46 on support 47. Piston 45 is operated hydraulically to reciprocate plungers 43.

Passages or chambers 36 open into an inner chamber 48 from which a relatively narrow discharge passage 49 leads toward loading chamber 28. The continuation 49a of such passage in loading chamber 29 has two pairs of passages adjacent thereto, as shown at 51 and 52, Fig. 6, for temperature controlling medium, whereby the temperature of the plastic passing through duct 49a may be regulated.

The loading chamber 28, as shown in Figs. 1, 4 and 6 to 8, is formed by an inverted cup 53 having a head 54 which fits in the top of an outer casing or jacket 55. This jacket has an inner intermediate rib 56 and a bottom rib or flange 57 engaging cup 53 and forming separate chambers 58 and 59 for temperature controlling medium.

The combined plunger and nozzle 29 has a tight sliding fit in cup 53. This device comprises an inner tube 61, containing passage 62 the head 63 of which is enlarged to fit the cup 53. Said head has a tapered or funnel-shaped opening 64 for facilitating flow of plastic into passage 62.

The tube 61 has a sleeve or jacket 65 fitted thereon and which, with radial ribs 66 on the tube 61, forms a passage 67 extending up and down and around the tube 61 for temperature control medium. The tube 61 and sleeve 65 are held in assembled relation by a nut 68 on the tube which engages both sleeve 65 and a cross head 69. Cross head 69 is carried by rods 71 which pass through machine head 26 and are connected to upper cross head 72 on rod 73 (Figs. 1 and 2) of piston 74 in cylinder 75. The passage 67 around tube 61 is connected at one end to an inlet passage 67a (Fig. 1) and an outlet passage in the cross head 67b (Fig. 2) to which flexible conduits are connected for the passage of temperature control medium through the plunger.

In performing my novel method plastic is periodically compressed and heated in the preheater 27, discharged into the loading chamber 28 through passage 49—49a, and delivered from the loading chamber to the die 11. With the parts of the machine in the positions shown in Fig. 1, one or more strokes of pistons 43 discharge plastic in fluent condition into loading chamber 28, port 49a being uncovered by plunger 29 at this time. Die 11 is now raised by piston 18 until it engages the combined plunger and nozzle 29. This registers sprue 13 with duct 62 in the plunger, Fig. 6. Further pressure of the die against the plunger displaces the plunger upwardly in the loading chamber and plastic is discharged under hydrostatic pressure into the die cavity 12. The upward movement of the die 11, and plunger 29 ceases automatically when the die cavity is filled. In other words, the discharge of plastic into the die is automatically measured, no plunger stroke adjustment being necessary. The initial upward movement of plunger 29 closes port 49a which is kept closed throughout the die charging operation to prevent plastic being forced back into the preheater 27. Sufficient plastic material remains in the loading chamber above plunger 29 to maintain hydrostatic pressure on the mold charge, so long as the die is pressed against the plunger by piston 18. See Fig. 7. When such pressure has been maintained long enough, the die is lowered and loosened by knockout 23 and the die slid out of the chase horizontally for the removal of the molded article. When the die 11 and plunger 29 separate, the plastic will separate between sprue 13 and duct 62 at the parting line of plunger and die. The plunger 62 is moved downwardly by piston 74 in cylinder 75 until it reaches its lowermost position and the inlet port 49a is opened. See Fig. 8. The operation may now be repeated.

As shown in Figs. 6 to 8, while the die 11 is being loaded from loading chamber 28, pistons 43 may be compressing the plastic next to be delivered to the loading chamber, so that the supply of plastic in the loading chamber may be quickly replenished after plunger 29 is lowered. Pistons 43 may make a number of strokes while port 49a is closed by plunger 29.

In transfer molding, the thermosetting material is acted upon in the above manner. Such material may be heated moderately, that is, well below the final curing temperature in preheater 27, further heated in duct 49—49a and either maintained in loading chamber 28 at the temperature it enters said chamber or further heated toward the final temperature of reaction by suitable medium in passage 58 but insufficiently to cause the plastic to set in said chamber 28.

By controlling the temperature of plunger 29, heating of the plunger, as by die 11, to the point at which plastic might be cured in passage 62 is prevented. This is essential to continual or periodic transfer molding without forming excess set material and requires accurate temperature control. This may be obtained by the use of oil, the temperature of which can be regulated very accurately. Obviously, if material should set up in passage 62, the operation would have to be interrupted for cleaning. The passage 59 of the loading chamber may be used to assist in maintaining the plunger 29 at the desired temperature.

The provision for separate temperature regulation in the preheater 27, around duct 49—49a, at 58, 59 of the loading chamber 28 and in the plunger 29 through passage 67 (which regulation may be accomplished nicely with oil, for example) enables me to bring the thermosetting plastic gradually toward but short of the curing temperature as it is delivered to the die 11 through passage 62. The plastic will be delivered in uniformly heated, densely compacted condition. The density of the plastic will be improved by the opportunity for the release of gases not only from the cool end of preheater 27 but from the loading chamber 28 from which gases may escape past the plunger 29 at the high pressures to which the plastic is subjected.

The uniform heating of the plastic and the high density obtained by my method and machine, and the accuracy of control of temperatures which permits heating closer to the conversion point than heretofore, enables me to reduce materially the curing time in the die. In fact, the material may be heated so uniformly and to such a high temperature that in making certain articles from selected compounds heating of the die is unnecessary; the cure being effected by the heat contained in the die and by heat stored in the die by repeated use. Usually, though not necessarily, the curing of the articles is completed under hydrostatic pressure exerted through the plastic in the chamber 28, passage 62 and sprue 13.

It is unnecessary to delay the production of articles to remove excess set material or culls from the loading chamber, nor is the operation limited to a certain number only of molding cycles, but articles may be molded in regularly recurring cycles for an indefinite period. In other words, the method may be performed continually.

I have not undertaken to illustrate the details of mechanisms for an automatic machine, but the invention definitely contemplates automatic operation. To this end, the supply and exhaust of hydraulic fluid to and from cylinders 18, 46 and 75 may be controlled by automatically timed valves and die 11 may be replaced by an automatically operated die. Such details do not per se form parts of the invention. They can be supplied by one of ordinary skill in the art, having in view the disclosure of my invention.

It will be observed that plunger 29 may readily be removed by removing crosshead 69 and nut 68, so that the loading chamber and plunger 29 may be cleaned or the plunger quickly replaced, the pistons 43 being at rest. The preheater 27 and loading chamber 28 also are quickly demountable separately or as a unit for cleaning, repair or replacement.

The bottom end portion of passage 62 may be tapered outwardly or downwardly to permit easy withdrawal of a limited amount of set passage material because while the plastic will part at the junction of nozzle and die, leaving no set material in the plunger, where the curing period is very long and the end of plunger 29 becomes too hot by contact with the die, some of the material may set in the bottom end of the passage. Such set material will be removed with the molded piece.

Although the preferred use of the machine is in the practice of the novel improved method of transfer molding in continually recurring cycles, it also may be used with improved results in molding thermoplastics, such as cellulose acetate compounds, vinyl compounds and polystyrene molding compounds. The provisions for heating in zones in the machine permit desirable temperature control and uniform heating to plasticate such materials and to deliver them to the die in larger volume per unit of time than prior machines, at least prior machines which deliver the plastic through a single nozzle to the dies. Furthermore, the heating may be so accurately controlled that charring of the plastic is avoided. It will be understood that the die 11 will not be heated in the molding of thermoplastics, but will be cooled. The heating of plunger 29 will thus prevent undesired chilling of the plunger which may be aided by the circulation of oil at the desired temperature through passage 59 of the loading chamber.

Variations may be made in the details of construction and in the performance of the method without departing from the scope of the appended claims.

Having thus described my invention, what I claim is:

1. A machine for molding plastics comprising a preheater having plunger means associated therewith for applying heat and pressure to molding compound to render it fluent, a loading chamber connected to said preheater, a partition separating the preheater and loading chamber and having a narrow passage therethrough for supply of preheated plastic material from the preheater to the loading chamber under force of the plunger means, a plunger mounted in said loading chamber having a passage therethrough, temperature controlling means associated with said plunger, a die, and means for moving said die into engagement with said plunger and for forcing said plunger into said loading chamber to discharge plastic material from said loading chamber and through said passage into said die and for thereafter moving said die out of engagement with said plunger.

2. A machine for molding plastics comprising a loading chamber, a plunger reciprocable in said chamber and extending through the bottom thereof, said plunger having a passage therethrough, means for controlling the temperature of said plunger, a die, means for moving said die into engagement with said plunger to force it upwardly into said loading chamber to charge said die with plastic material from said loading chamber, and means for forcing preheated plastic material into said loading chamber.

3. The method of molding plastic material of the type which reacts to permanently infusible condition when sufficiently heated and subjected to pressure and in which mold charges of such material are delivered from a loading chamber through a narrow passage in an elongated nozzle to a die, which comprises periodically delivering charges of such material to the loading chamber in regularly recurring cycles and at least as frequently as mold charges are delivered to said die, so controlling the temperature of said loading chamber as to permit the material to flow therefrom but to prevent premature hardening thereof in said chamber, periodically delivering said mold charges to said die through said nozzle, heating said die to react to infusibility the mold charges therein to produce a succession of articles, and controlling the temperature of said nozzle independently of said loading chamber and of said die to prevent such reaction of material to infusibility in said passage as would clog said passage and prevent the delivery of additional mold charges through said passage to said die.

4. The method of molding plastic material of the type which reacts to permanently infusible condition when sufficiently heated and subjected to pressure and in which method mold charges of such material are delivered from a loading chamber through a narrow passage in an elongated nozzle to a die, which comprises periodically delivering charges of such material to the loading chamber in regularly recurring cycles and at least as frequently as mold charges are delivered to said die, so controlling the temperature of said loading chamber as to permit the material to flow therefrom but to prevent premature hardening thereof in said chamber, periodically delivering said mold charges to said die through said nozzle, heating said die to react to infusibility the mold charges therein to produce a succession of articles, controlling the temperature of said nozzle independently of said loading chamber and of said die to prevent such reaction of material to infusibility in said passage as would clog said passage and prevent the delivery of additional mold charges through said passage to said die, completely disengaging the die and the nozzle after each die charging operation, and clearing the passage in said nozzle of any reacted material therein by removing such material with the molded articles.

5. The method of molding plastic material of the type which reacts to permanently infusible condition when sufficiently heated and subjected to pressure and in which method mold charges of such material are delivered from a loading chamber through a narrow passage in an elongated nozzle to a die, which comprises preheating such material to a temperature well below that at which said material reacts to infusibility and periodically delivering charges of such preheated material to the loading chamber in regularly recurring cycles and at least as frequently as mold charges are delivered to said die, so controlling the temperature of said loading chamber as to permit the material to flow therefrom but to prevent premature hardening thereof in said chamber, periodically delivering said mold charges to said die through said nozzle, heating said die to react to infusibility the mold charges therein to produce a succession of articles, and controlling the temperature of said nozzle independently of said loading chamber and of said die to prevent such reaction of material to infusibility in said passage as would clog said passage and prevent the delivery of additional mold charges through said passage to said die.

6. Apparatus for molding plastic material of the type which reacts to permanently infusible condition when sufficiently heated and subjected to pressure, which comprises a loading chamber, an elongated nozzle having a narrow passage therethrough, a die, means for applying pressure to material in said loading chamber to deliver such material through said passage into said die, means for controlling the temperature of said loading chamber to properly heat condition the material therein for delivery to said die, means for heating said die to react to infusibility the material delivered thereto, means independent of the means for controlling the temperature of said loading chamber and of the means for heating said die for controlling the temperature of said nozzle and to prevent such reaction of material in the passage in said nozzle as would clog said passage and prevent the delivery of additional mold charges through said passage to said die, and means for moving said die into and out of engagement with said nozzle.

FRANK H. SHAW.